(12) United States Patent  
Hwang et al.

(10) Patent No.: US 7,583,575 B2  
(45) Date of Patent: Sep. 1, 2009

(54) METHOD OF MANAGING DEFECTS FOR A WRITE-ONCE RECORDING MEDIUM, REPRODUCING AND/OR RECORDING APPARATUS IMPLEMENTING THE SAME, A CORRESPONDING WRITE-ONCE RECORDING MEDIUM THEREFOR, AND MEDIUM INCLUDING COMPUTER READABLE CODE CONTROLLING THE IMPLEMENTATION OF THE SAME

(75) Inventors: Sung-hee Hwang, Seoul (KR); Jung-wan Ko, Gyeonggi-do (KR); Kyung-geun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1163 days.

(21) Appl. No.: 10/804,016

(22) Filed: Mar. 19, 2004

(65) Prior Publication Data

US 2004/0208098 A1 Oct. 21, 2004

(30) Foreign Application Priority Data

Apr. 19, 2003 (KR) ........................ 10-2003-0024869

(51) Int. Cl.
*G11B 7/00* (2006.01)

(52) U.S. Cl. .............. 369/53.17; 369/47.22; 369/47.14; 369/59.25; 369/53.15

(58) Field of Classification Search ...................... None
See application file for complete search history.

(56) References Cited

U.S. PATENT DOCUMENTS 7,289,404 B2 * 10/2007 Park et al. ................. 369/53.17

* cited by examiner

*Primary Examiner*—Jorge L Ortiz Criado
(74) *Attorney, Agent, or Firm*—Stein McEwen, LLP

(57) ABSTRACT

A method of managing defects considering compatibility with a rewritable disc, a reproducing and/or recording apparatus implementing the same, a write-once recording medium therefore, and a medium including computer readable code controlling the implementation of defect management. The method includes providing a plurality of temporary defect management areas on the write-once recording medium; performing defect management using the plurality of temporary defect management areas; and when one among the plurality of temporary defect management areas is exhausted, writing full flag information indicating that the one temporary defect management area is exhausted to at least one among remaining temporary defect management areas. Accordingly, defect management can be efficiently performed.

44 Claims, 9 Drawing Sheets

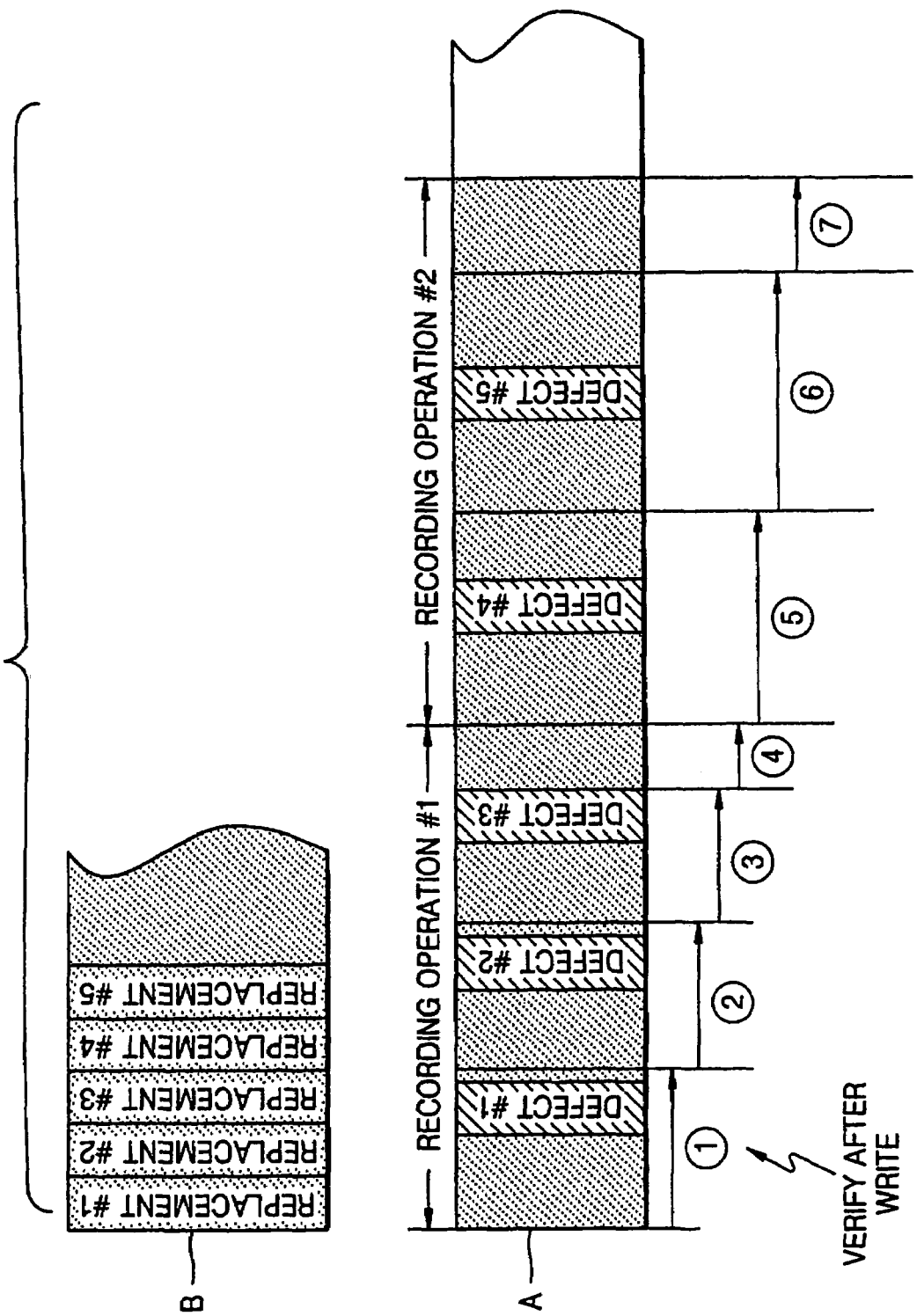

METHOD OF MANAGING DEFECTS FOR A WRITE-ONCE RECORDING MEDIUM, REPRODUCING AND/OR RECORDING APPARATUS IMPLEMENTING THE SAME, A CORRESPONDING WRITE-ONCE RECORDING MEDIUM THEREFOR, AND MEDIUM INCLUDING COMPUTER READABLE CODE CONTROLLING THE IMPLEMENTATION OF THE SAME

CROSS-REFERENCE TO RELATED APPLICATIONS

This application claims the priority benefit of Korean Patent Application No. 2003-24869, filed on Apr. 19, 2003, in the Korean Intellectual Property Office, the disclosure of which is incorporated herein in its entirety by reference.

BACKGROUND OF THE INVENTION

1. Field of the Invention

The present invention is directed toward the management of defects on a write-once recording medium, and more particularly, to a method of managing defects in a write-once recording medium while maintaining compatibility with a rewritable reproducing and/or recording apparatus, a reproducing and/or recording apparatus for implementing the same, a write-once recording medium therefore, and a medium including computer readable code controlling the implementation of the same.

2. Description of the Related Art

Defect management is a process of storing user data in a spare area, when a previous attempt to record the user data in the user data area resulted in the recorded user data having a defect. Conventionally, defect management on a recording medium is performed using linear replacement or slipping replacement. Linear replacement is a process of replacing a defective sector in a user data area with a sector having no defects in a spare area. Slipping replacement is a process of skipping a defective sector and using the first good sector immediately following the defective sector.

Both linear replacement and slipping replacement can be used only for recording media, e.g., DVD-RAM discs and DVD-RW discs, to which data can be rewritten and/or to which data can be written using random access. In other words, it is difficult to apply conventional linear replacement and slipping replacement to write-once recording media. Whether a defect has occurred can be verified by actually writing data to a recording medium. However, since data cannot be re-written to write-once recording media, defect management cannot be performed on write-once recording media using these conventional methods.

Meanwhile, high-density write-once recording media, having a capacity of several ten GBs, have been developed following the development of CD-R and DVD-R recording media. These recording media are inexpensive and enable data to be read using random access, thereby having a fast reading speed. Because of these advantages, they are usually used for system backups. However, since defect management is not performed on write-once recording media, a backup is interrupted when a defective sector occurs during the backup. In particular, since the backup is usually performed while a system is not frequently used, i.e., during the night while an operator is absent, there is a high likelihood that backup is left interrupted without being resumed.

Conventionally, positional information of areas provided for defect management is disclosed by defined rules in specifications, e.g., DVD specifications, and reproducing and/or recording apparatus designers design reproducing and/or recording apparatuses based on the specifications. Accordingly, if new areas are added to a recording medium, in addition to areas used for conventional defect management, a conventional reproducing and/or recording apparatus cannot properly recognize the new areas, and defect management cannot be performed properly.

SUMMARY OF THE INVENTION

Embodiments of the present invention provide for methods of managing defects on a write-once recording medium to allow recording to be smoothly performed on the write-once recording medium, a reproducing and/or recording apparatus for the same, a write-once recording medium therefore, and a medium including computer readable code controlling the implementation of the same.

Embodiments of the present invention also provide for methods of managing defects on a write-once recording medium, such that the write-once recording medium is compatible with a rewritable reproducing and/or recording apparatus, a reproducing and/or recording apparatus for the same, a write-once recording medium therefore, and a medium including computer readable code controlling the implementation of the same.

Additional aspects and/or advantages of the invention will be set forth in part in the description which follows and, in part, will be obvious from the description, or may be learned by practice of the invention.

To accomplish the above and/or other aspects and advantages, embodiments of the present invention include a method of managing defects on a recording medium, the recording medium including a plurality of temporary defect management areas for managing defects detected on the recording medium, including performing defect management using the plurality of temporary defect management areas, and writing full flag information indicating that one temporary defect management area, of the plurality of temporary defect management areas, is exhausted to at least one of the remaining plurality of temporary defect management areas when the one temporary defect management area is exhausted.

To accomplish the above and/or additional aspects and advantages, embodiments of the present invention further include method of managing defects on a recording medium having a single recording layer on which a lead-in area, a data area, and a lead-out area are sequentially disposed, the data area having a first spare area and a second spare area at the respective opposite ends thereof, including allocating a first temporary defect management area to at least one of the lead-in area and the lead-out area of the recording medium, allocating a second temporary defect management area between the first spare area and a user data area or between the user data area and the second spare area, performing defect management for the recording medium using the first and second temporary defect management areas, and writing full flag information, indicating that one of the first and second temporary defect management areas is exhausted, to the other one of the first and second temporary defect management areas, when the one of the first and second temporary defect management areas is exhausted.

To accomplish the above and/or further aspects and advantages, embodiments of the present invention include a method of managing defects on a recording medium having a first recording layer and a second recording layer, the first recording layer including a lead-in area, a data area, and an outer area which are sequentially disposed according to a recording path wherein the data area of the first recording layer has a first spare area and a second spare area at the respective opposite ends thereof, the second recording layer including an outer area, a data area, and a lead-out area which are sequentially disposed according to the recording path wherein the data area of the second recording layer has a third spare area and a fourth spare area at the respective opposite ends thereof, including allocating a first temporary defect management area to at least one among the lead-in area, the lead-out area, and the outer areas of the recording medium, allocating a second temporary defect management area between the first spare area and a user data area and/or between the fourth spare area and the user data area, performing defect management for the recording medium using the first and second temporary defect management areas, and writing full flag information, indicating that one of the first and second temporary defect management areas is exhausted, to the other one of the first and second temporary defect management areas when the one of the first and second temporary defect management areas is exhausted.

To accomplish the above and/or still further aspects and advantages, embodiments of the present invention include a reproducing and/or recording apparatus including a pickup to write data to or read data from a recording medium, and a control unit to verify data written to or read from the recording medium by the pickup, perform defect management using a plurality of temporary defect management areas provided on the recording medium, and control the pickup to write full flag information, indicating that one of the plurality of temporary defect management areas is exhausted, to at least one of the remaining temporary defect management areas when the one temporary defect management area is exhausted.

To accomplish the above and/or other aspects and advantages, embodiments of the present invention include a write-once recording medium having a single recording layer on which a lead-in area, a data area, and a lead-out area are sequentially disposed, the data area having a first spare area, a user data area, and a second spare area which are sequentially disposed, the write-once recording medium including a defect management area provided in at least one of the lead-in area and the lead-out area including defect management information for performing defect management of the write-once recording medium during playback, a first temporary defect management area provided in at least one of the lead-in area and the lead-out area including temporary management information recorded to the write-once recording medium with a predetermined period, and a second temporary defect management area provided between the first spare area and the user data area or between the user data area and the second spare area including temporary management information recorded to the write-once recording medium with a period different from the predetermined period, wherein full flag information, indicating whether the second temporary defect management area is exhausted, is recorded in the first temporary defect management area, and full flag information, indicating whether the first temporary defect management area is exhausted, is recorded in the second temporary defect management area.

To accomplish the above and/or other aspects and advantages, embodiments of the present invention include a write-once recording medium having a first recording layer and a second recording layer, the first recording layer including a lead-in area, a data area, and an outer area which are sequentially disposed according to a recording path and wherein the data area has a first spare area and a second spare area at the respective opposite ends thereof, the second recording layer including an outer area, a data area, and a lead-in area which are sequentially disposed according to the recording path and wherein the data area has a third spare area and a fourth spare area at the respective opposite ends thereof, the write-once recording medium including a defect management area provided in at least one of the lead-in area, the lead-out area, and the outer areas, including defect management information, a first temporary defect management area provided in at least one of the lead-in area, the lead-out area, and the outer areas, including temporary management information recorded to the write-once recording medium with a predetermined period, and a second temporary defect management area provided between the first spare area and the user data area of the first recording layer and/or between the fourth spare area and the user data area of the second recording layer, including temporary management information recorded to the write-once recording medium with a period different from the predetermined period, wherein full flag information, indicating whether the second temporary defect management area is exhausted, is recorded in the first temporary defect management area, and full flag information, indicating whether the first temporary defect management area is exhausted, is recorded in the second temporary defect management area.

To accomplish the above and/or still other aspects and advantages, embodiments of the present invention include a recording medium, including a defect management area recording defect management information for defect management of user data recorded on the recording medium during playback of the user data, and a plurality of temporary defect management areas recording temporary management information for defect management, of the user data area, during recording of user data on the recording medium, and including information on whether one of the plurality of temporary defect management areas has been exhausted, wherein upon finalization of the recording medium, temporary management information defect information recorded in one of the plurality of temporary defect management areas is recorded in the defect management area as the defect management information.

To accomplish the above and/or other aspects and advantages, embodiments of the present invention include a defect management method, including recording a plurality of temporary defect management areas including temporary defect information for defect management, of a user data area, during recording of user data on the recording medium, and recording information on whether one of the plurality of temporary defect management areas has been exhausted, and recording one of the plurality of temporary defect management areas in a defect management area of the recording medium, for defect management of user data recorded on the recording medium during playback of the user data.

To accomplish the above and/or other aspects and advantages, embodiments of the present invention further include media comprising computer readable code controlling the implementation of the above methods to control a reproducing and/or recording apparatus to perform defect management using a plurality of temporary defect management areas and the recording of the full flag information.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 7 is a diagram illustrating an operation of writing data to a user data area and a spare area, according to an embodiment of the present invention;

DETAILED DESCRIPTION OF THE PREFERRED EMBODIMENTS

Figure 1:
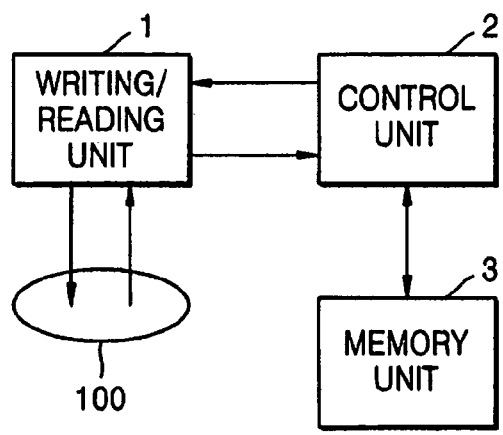
FIG. 1 is a block diagram of an apparatus for performing defect management, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of an apparatus for performing defect management, according to an embodiment of the present invention. Referring to FIG. 1, the apparatus includes a writing/reading unit 1, a control unit 2, and a memory unit 3. The writing/reading unit 1 writes data to a recording medium 100, e.g., an information storage medium, and reads the written data in order to verify the written data. The control unit 2 can control the implementation of defect management, according to embodiments of the present invention. In other words, the control unit 2 performs defect management using a plurality of temporary defect management areas provided in different types of areas on the recording medium 100. When one of two temporary defect management areas is filled with temporary management information, the control unit 2 writes to the other temporary defect management area that the one temporary defect management area is full so that a reproducing and/or recording apparatus can recognize that the one temporary defect management area has been exhausted, thereby providing reliability to the system. Thereafter, the control unit 2 performs defect management using only the other temporary defect management area.

In this embodiment of the present invention, the control unit 2 uses the verify-after-write verification technique, in which data is written in predetermined units and the written data is verified to detect defects. The control unit 2 writes user data in predetermined units and verifies the user data to detect a defective sector. The control unit 2 then generates defect information indicating a position of the detected defective sector, stores defect information in the memory unit until a predetermined amount of defect information is collected, and writes the collected defect information to two temporary defect management areas provided on the recording medium 100, according to embodiments of the present invention. Information written to a temporary defect management area is referred to as temporary management information, distinguished from management information written to a defect management area for defect management. The two temporary defect management areas can have different periods with which temporary management information is written.

According to embodiments of the present invention, whenever a predetermined number of clusters in a data area on the recording medium 100 is filled or when verification is completed after at least one writing, the control unit 2 reads defect information from the memory unit 3, provides the defect information to the writing/reading unit 1, and writes the defect information to one temporary defect management area as temporary management information. Furthermore, when a user presses an eject button (not shown) on the apparatus to remove the recording medium 100, after predetermined data is completely written to the recording medium 100, the control unit 2 predicts that one recording operation will end. Then, the control unit 2 reads defect information from the memory unit 3, provides it to the writing/reading unit 1, and commands the writing/reading unit 1 to write it to another temporary defect management area.

During defect management, when at least one temporary defect management area is used and no more information can be written thereto, the control unit 2 writes full flag information to at least one other temporary defect management area indicating the fact that no more information can be written to the at least one temporary defect management area. After writing the full flag information, the control unit 2 writes temporary management information only to the other temporary defect management areas.

When data is completely written to the recording medium 100, that is, when the recording medium 100 is finalized so as to terminate data recording, the control unit 2 writes the most updated temporary management information on the recording medium 100 to a defect management area on the recording medium 100.

Generally, a defect management area allocated in a rewritable recording medium is not very large. Accordingly, if a write-once recording medium is provided with a defect management area having the same size at the same position as a rewritable disc, considering only compatibility, the defect management area will be exhausted before data is written to the write-once disc, and defect management cannot be performed. To overcome this and/or other problems, in embodiments of the present invention, a plurality of temporary defect management areas are separately provided, in different types of areas on the write-once recording medium, in addition to the defect management area, and final effective information is written to the defect management area in response to a user's command or finalization. Accordingly, a write-once recording medium, according to embodiments of the present invention, can be recognized properly by a reproducing and/or recording apparatus for rewritable recording media. In other words, according to embodiments of the present invention, a write-once recording medium is allocated a plurality of temporary defect management areas in different types of areas, such that they do not influence other areas defined on a rewritable disc, thereby allowing defect management in the write-once recording medium, having compatibility with a reproducing and/or recording apparatus for rewritable recording media having a defect management area. Furthermore, when one of a plurality of temporary defect management areas, having different periods with which temporary management information is written, is exhausted, full flag information is written to other temporary defect management areas so that defect management is performed efficiently.

Figure 2:
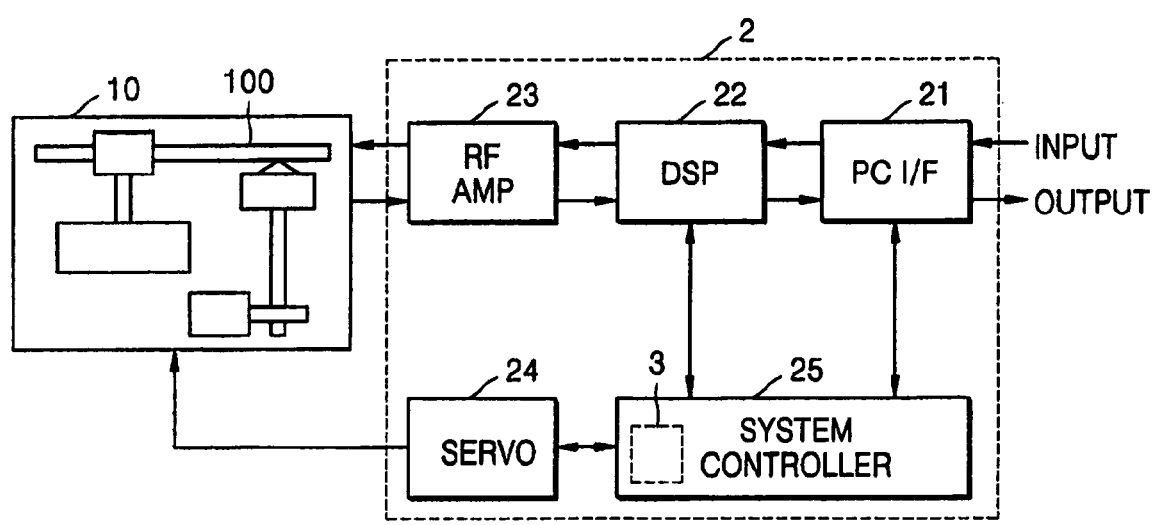
FIG. 2 is a block diagram of a reproducing and/or recording apparatus including the apparatus shown in FIG. 1, according to an embodiment of the present invention.

FIG. 2 is a block diagram of an apparatus in which the apparatus shown in FIG. 1 is implemented, noting that the apparatus in FIG. 2 can also be a reproducing and/or recording apparatus, e.g., a disk drive. Referring to FIG. 2, the reproducing and/or recording apparatus includes a pickup 10, as the writing/reading unit 1. The recording medium 100 is loaded in the pickup 10. The reproducing and/or recording apparatus includes the control unit 2, including a personal computer interface (PC I/F) 21, a digital signal processor (DSP) 22, a radio frequency amplifier (RF AMP) 23, a servo 24, and a system controller 25. The memory unit 3 can be provided in the system controller 25 of the control unit 2.

During recording, the PC I/F 21 receives a write command, together with data to be written from a host (not shown). The system controller 25 performs initialization for recording. The DSP 22 performs error correction coding (ECC) by adding additional data such as parity for error correction to the data received from the PC I/F 21 and modulates the error correction coded data according to a predetermined method. The RF AMP 23 converts the data output from the DSP 22 into an RF signal. The pickup 10 writes the RF signal output from the RF AMP 23 to the recording medium 100. The servo 24 receives commands necessary for servo control from the system controller 25 and performs servo control on the pickup 10. In addition, to perform defect management during recording, according to embodiments of the present invention, the system controller 25 can command the pickup 10 to read the written data or to write predetermined information such as temporary management information.

During playback, the PC I/F 21 receives a playback command from the host. The system controller 25 performs initialization for playback. The pickup 10 radiates a laser beam onto the recording medium 100, then receives the laser beam reflected from the recording medium 100, and then outputs a signal obtained from the received laser beam. The RF AMP 23 converts the signal output from the pickup 10 into an RF signal, provides modulated data obtained from the RF signal to the DSP 22, and provides a servo signal obtained from the RF signal for control to the servo 24. The DSP 22 demodulates the modulated data, performs ECC on the demodulated data, and outputs data resulting from the ECC. Meanwhile, the servo 24 receives the servo signal from the RF AMP 23 and a command necessary for servo control from the system controller 25 and performs the servo control on the pickup 10. The PC I/F 21 transmits the data received from the DSP 22 to the host. In addition, the system controller 25 can command the pickup 10 to read information necessary for defect management. In other words, the system controller 25 can entirely manage the system during recording and playback.

Figure 3A:
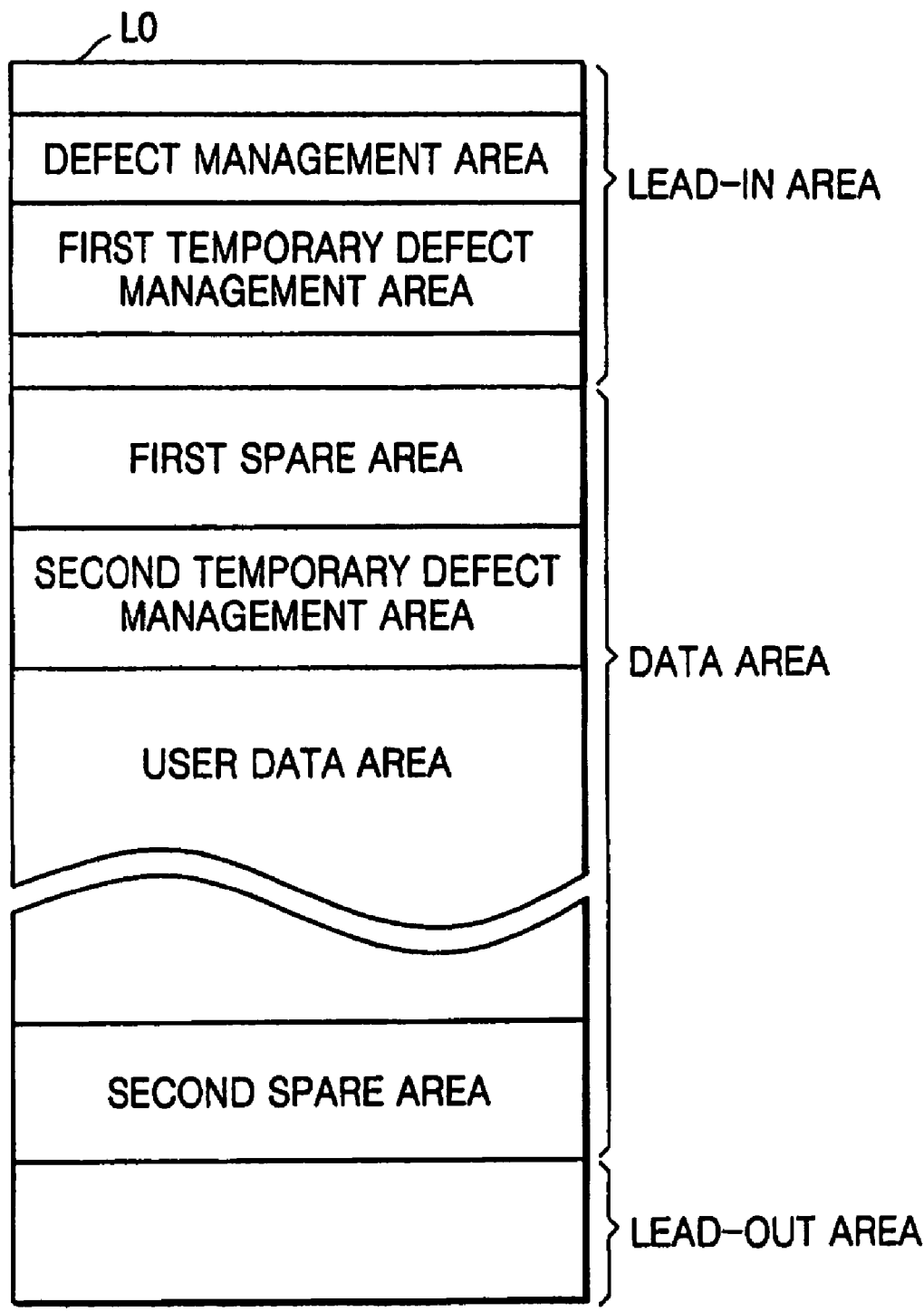
FIGS. 3A and 3B are diagrams illustrating the physical and data structures of a recording medium on which a plurality of temporary defect management areas are allocated, according to embodiments of the present invention.
Figure 3B:
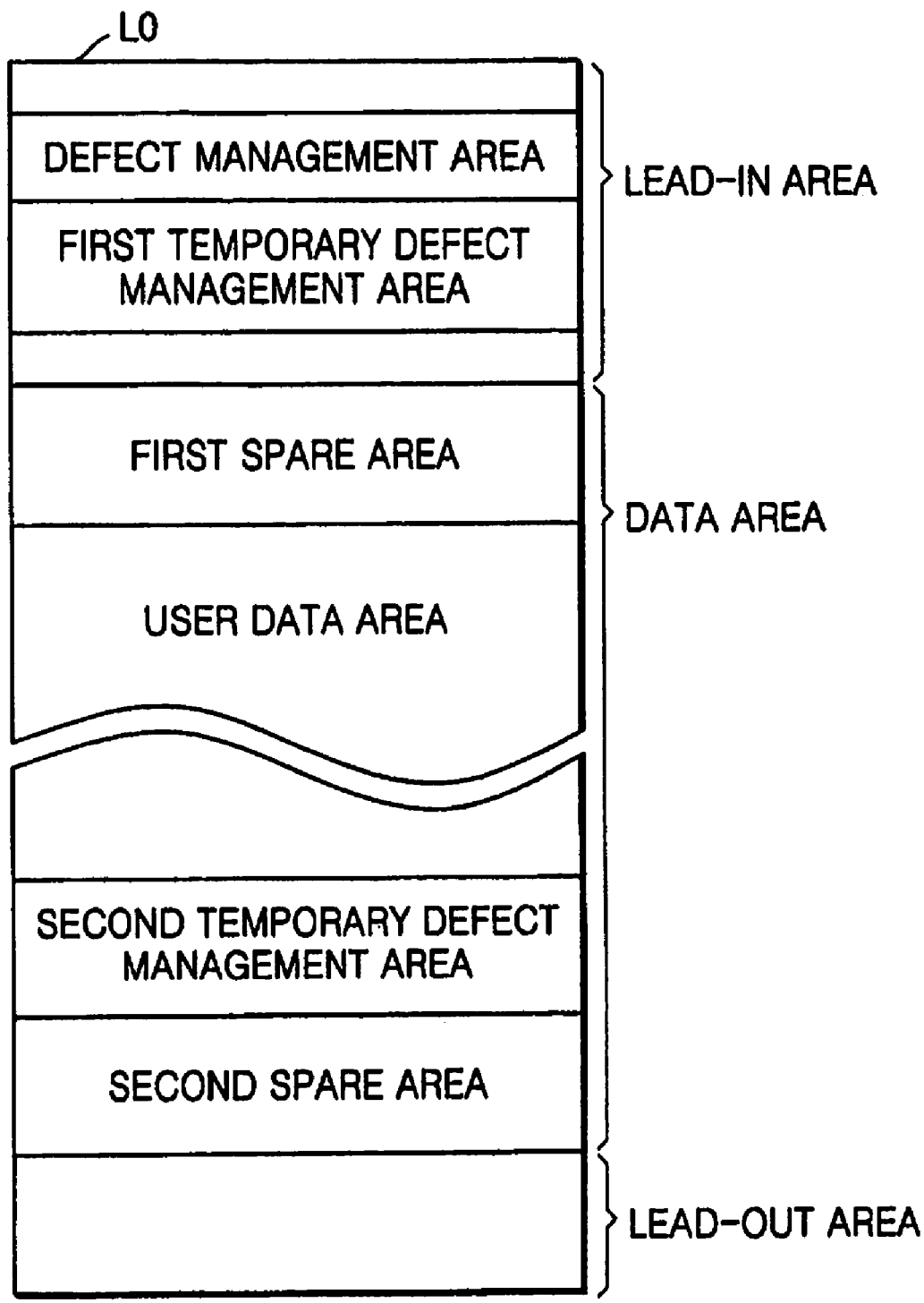

FIGS. 3A and 3B are diagrams illustrating structures of the recording medium 100 on which a plurality of temporary defect management areas are allocated, according to embodiments of the present invention. Referring to FIGS. 3A and 3B, the recording medium 100 can be a single-layer recording medium having a single recording layer L0 and includes a lead-in area, a data area, and a lead-out area. The lead-in area is positioned at the inner diameter of the recording medium 100, and the lead-out area is positioned at the outer diameter of the recording medium 100. The data area is positioned between the lead-in area and the lead-out area. The start and the end of the data area on the recording medium 100 may be the same as those on a rewritable disc. The data area is divided into a first spare area, a user data area, and a second spare area, sequentially from the inner diameter toward the outer diameter. User data is written to the user data area. The first and second spare areas are provided to compensate for loss of recording space due to defects in the user data area. Preferably, the first and second spare areas are set to secure a maximum data capacity allowable when considering defects on the recording medium 100.

A defect management area is provided in the lead-in area on the recording medium 100, at the same position as a defect management area would be provided on a rewritable disc. Like the rewritable recording medium, on which defect management can be performed, the defect management area on the recording medium 100 includes size information of the first spare area, start position information of the user data area, end position information of the user data area, and size information of the second spare area. Accordingly, the reproducing and/or recording apparatus, knowing the start and the end of the data area, becomes aware of the start and end positions of the user data area by reading the information from the defect management area, thereby recognizing the first and second spare areas based on the position and size information.

A first temporary defect management area is provided in the lead-in area, and a second temporary defect management area is provided in the data area. The second temporary defect management area is allocated between the first spare area and the user data area, in the data area on the recording medium 100 according to a user's option at the initialization of recording/playback, or this may be provided by default. Even when the second temporary defect management area is newly allocated, the start and the end of the data area do not change.

The first temporary defect management area is updated upon each recording operation. The second temporary defect management area is updated whenever a predetermined amount of information, corresponding to a predetermined number of clusters, is written or whenever a verify-after-write operation is completed at least one time. Accordingly, the second temporary defect management area is more frequently updated than the first temporary defect management area and thus needs a wider physical area than the first temporary defect management area. Accordingly, the first temporary defect management area, requiring a relatively small area, is provided in the lead-in area or the lead-out area, while the second temporary defect management area, requiring a relatively large area, is provided in the data area.

Referring to FIG. 3A, the second temporary defect management area is allocated between the first spare area and the user data area, in the data area on the recording medium 100, according to the aforementioned user's selection at the initialization of recording/playback or provided by default.

Referring to FIG. 3B, the second temporary defect management area is allocated between the user data area and the second spare area, in the data area on the recording medium 100, according to a user's selection at the initialization of recording/playback or provided by default.

Temporary management information is written to the first and second temporary defect management areas. Temporary management information includes temporary defect information and management information for managing the temporary defect information.

Providing the first temporary defect management area together with the second temporary defect management area offers the following advantages. Since the first temporary defect management area is updated at each recording operation, when power is turned off during a recording operation, that is, while a reproducing and/or recording apparatus is temporarily storing updated temporary management information and is standing by for another recording, the updated temporary management information is lost, which may cause a problem in using the recording medium 100 later. However, since the second temporary defect management area is updated whenever a verify-after-write operation is completed, a problem caused by power interruption of the reproducing and/or recording apparatus during the standby for recording, i.e., loss of information or damage to the recording medium 100 due to the information loss, can be prevented. In addition, since an integer number of verifications are performed at each recording operation, when the first temporary defect management area is updated whenever a verify-after-write operation is completed, final effective information is recorded in the first and second temporary defect management areas at the end of a recording operation so that robustness of information can be increased. As described above, the second temporary defect management area solves a problem that may occur due to power interruption in a recording standby mode, and simultaneously increases robustness of information.

A rewritable reproducing and/or recording apparatus recognizes the first and second spare areas based on position information written to the defect management area. Since the positions of the first and second spare areas on a write-once recording medium, having the structure shown in FIG. 3A or 3B do not change, when the write-once recording medium is inserted into the rewritable reproducing and/or recording apparatus, information that has been re-written to the first and second spare areas according to defect management can be correctly read, and the start and the end of the user data area can be correctly recognized based on the position information in the defect management area. As a result, a problem of potentially having an erroneous recognition of an area does not occur when playback is performed in response to a command from the host.

Figure 4:
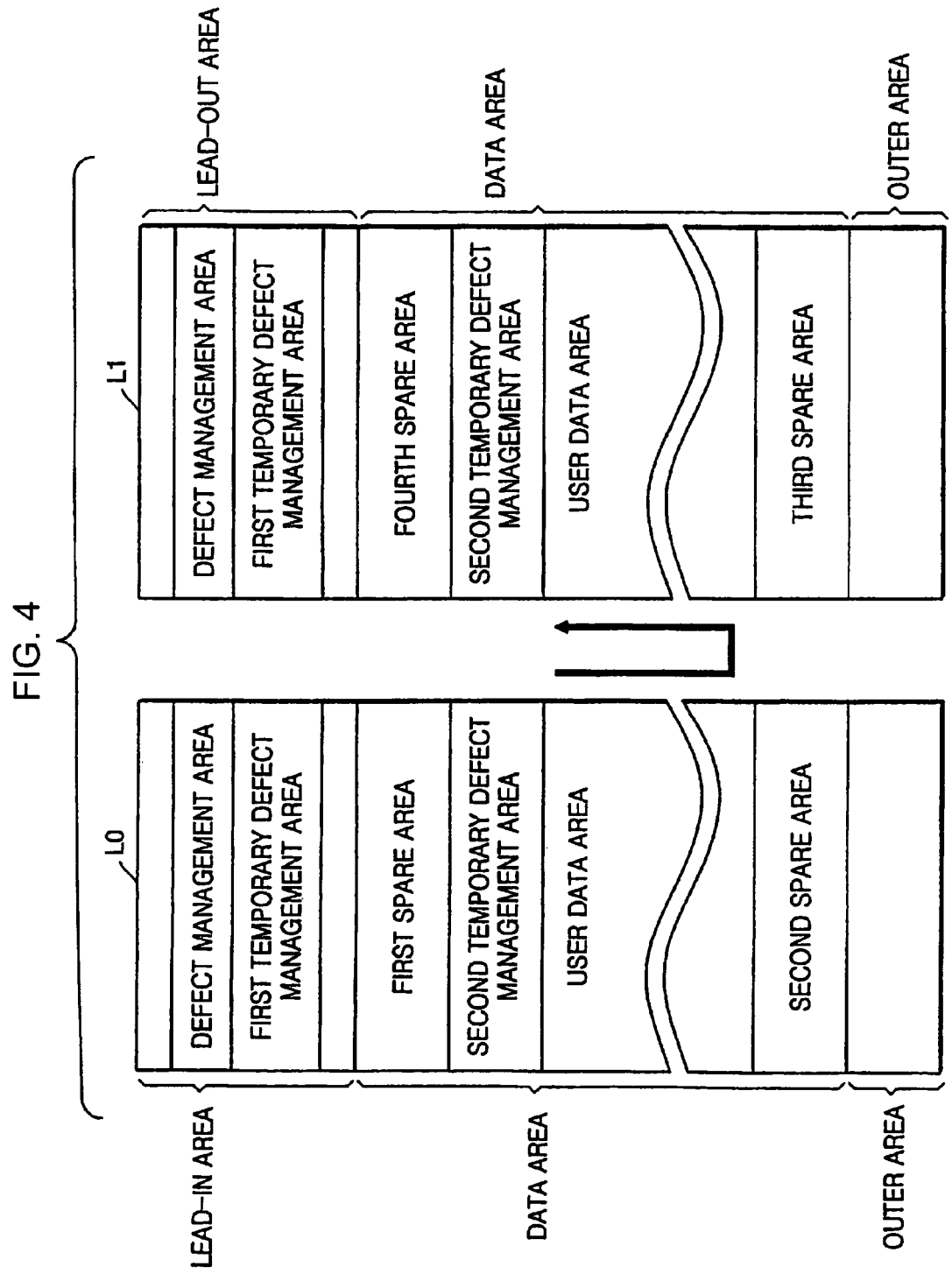
FIG. 4 is a diagram illustrating a physical and data structure of a recording medium on which a plurality of temporary defect management areas are allocated, according to another embodiment of the present invention.

FIG. 4 is a diagram illustrating a structure of the recording medium 100 on which a plurality of temporary defect management areas are allocated, according to another embodiment of the present invention. Referring to FIG. 4, the recording medium 100 can be a double-layer recording medium having recording layers L0 and L1. In the recording layer L0, a lead-in area, a data area, and an outer area are sequentially disposed from the inner diameter to the outer diameter of the recording medium 100. In the recording layer L1, an outer area, a data area, and a lead-out area are sequentially disposed from the outer diameter to the inner diameter of the recording medium 100. Unlike the single-layer recording media shown in FIGS. 3A and 3B, the lead-out area is disposed at the inner diameter of the recording medium 100. In other words, recording is performed according to an opposite track path (OTP) from the lead-in area in the recording layer L0 to the outer area in the recording layer L0 and then from the outer area in the recording layer L1 to the lead-out area of the recording layer L1. Two spare areas are allocated to each of the recording layers L0 and L1, and therefore, four spare areas, i.e., first through fourth spare areas, are allocated to the recording medium 100.

A defect management area and a first temporary defect management area are provided in one or both of the lead-in area and the lead-out areas. The defect management area is disposed at the same position as a defect management area on a rewritable disc. The first temporary defect management area is disposed such that it does not change the positions of the lead-in and lead-out areas, as defined for a conventional write-once recording medium or a rewritable disc. One or both of the defect management area and the first temporary defect management area can be disposed in the outer area.

Like rewritable recording media, on which defect management can be performed, the defect management area on the recording medium 100 shown in FIG. 4 includes size information of the first spare area, start position information of the user data area, end position information of the user data area, size information of the second spare area plus the third spare area, and size information of the fourth spare area. Accordingly, a reproducing and/or recording apparatus, knowing the start and the end of the data area, can become aware of the start and end positions of the user data area by reading the information from the defect management area and recognize the first through fourth spare areas based on the position and size information. Here, the second spare area can have the same size as the third spare area.

The second temporary defect management areas are disposed between the first spare area 1 and the user data in the recording layer L0, and is disposed between the user data area and the fourth spare area in the recording layer L1. The start and end of the data area in each of the recording layers L0 and L1 are the same as those shown in FIGS. 3A and 3B. With such arrangement, each area on the write-once recording medium 100 having two recording layers can be correctly recognized by a rewriteable reproducing and/or recording apparatus, e.g., a reproducing and/or recording apparatus for rewritable recording media having two recording layers. When the position of the second temporary defect management areas change in the data area, the reproducing and/or recording apparatus for rewritable recording media, having two recording layers, cannot properly recognize each area on the recording medium 100. The reason has been described above with reference to FIGS. 3A and 3B.

Figure 5A:
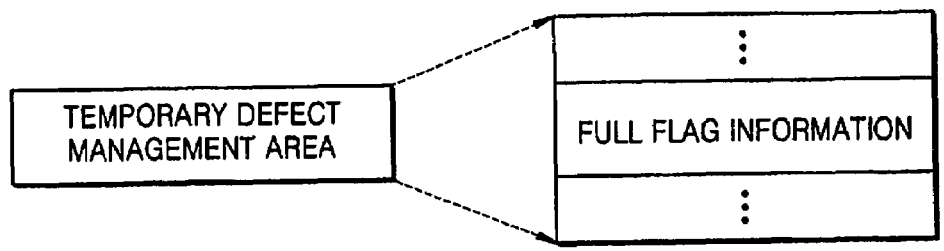
FIGS. 5A and 5B are diagrams illustrating information written to a temporary defect management area, according to embodiments of the present invention.
Figure 5B:
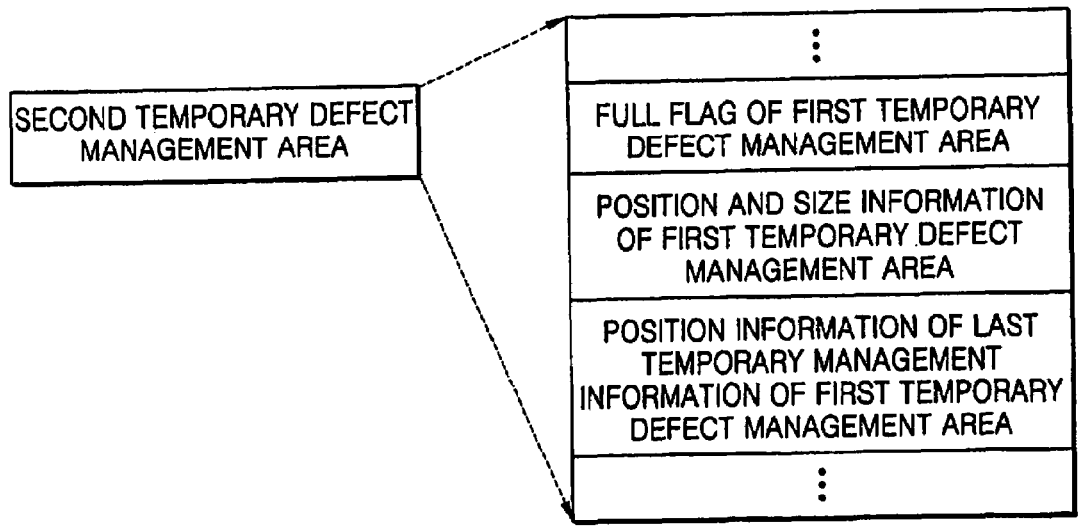

FIGS. 5A and 5B are diagrams illustrating information written to a temporary defect management area, according to embodiments of the present invention. Referring to FIG. 5A, each of a plurality of temporary defect management areas includes full flag information. The full flag information indicates that a certain temporary defect management area is exhausted and does not allow temporary management information to be written thereto any more.

Referring to FIG. 5B, in an embodiment of the present invention, the second temporary defect management area includes full flag information indicating that the first temporary defect management area has been exhausted and prevents temporary management information from being written to the first temporary defect management area any more. The second temporary defect management area further includes position and size information of the first temporary defect management area, and position information of last temporary management information written to the first temporary defect management area. The position and size information of the first temporary defect management area indicates the position and the size of the first temporary defect management area. The position information of the last temporary management information written to the first temporary defect management area indicates the position of temporary management information that was last written to the first temporary defect management area.

Figure 6A:
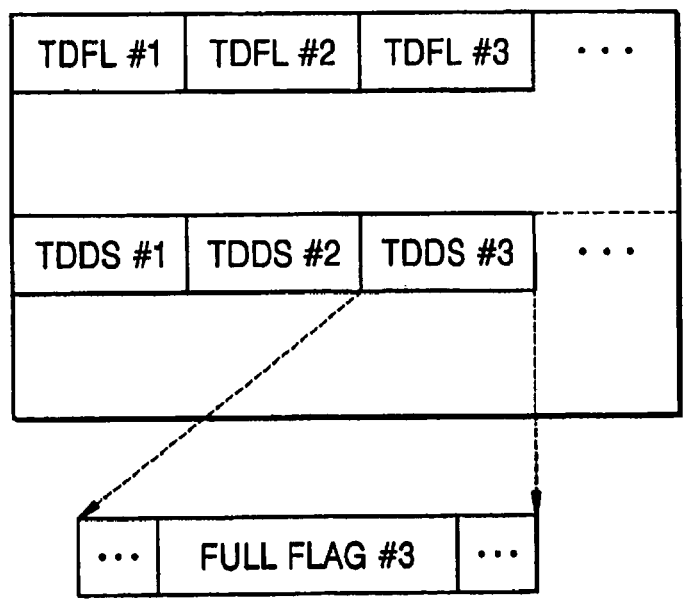
FIGS. 6A and 6B are diagrams illustrating data structures of a temporary defect management area, according to embodiments of the present invention.
Figure 6B:
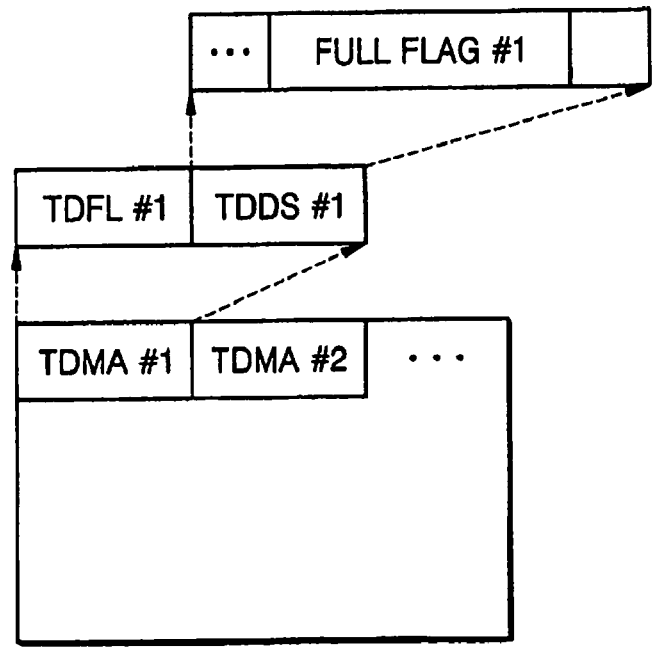

FIGS. 6A and 6B are diagrams illustrating data structures of a temporary defect management area, according to embodiments of the present invention. Referring to FIG. 6A, the temporary defect management area is logically divided into a temporary defect information area and a temporary defect management information area. Temporary defect information TDFL #1, TDFL #2, TDFL #3 and the like are sequentially written to the temporary defect information area from the front portion thereof. Temporary defect management information TDDS #1, TDDS #2, TDDS #3, and the like are also sequentially written to the temporary defect management information area from the front portion thereof. The temporary defect management information TDDS #1, TDDS #2, and TDDS #3 respectively correspond to the temporary defect information TDFL #1, TDFL #2, and TDFL #3. In this embodiment of the present invention, the full flag information is written in the form of a field as an element of the temporary defect management information. For example, when a certain temporary defect management area is exhausted and does not allow temporary management information to be written thereto any more, the full flag may change from 0 to 1.

Alternatively, the temporary defect information TDFL #1, TDFL #2, TDFL #3 and the like may be sequentially written to the temporary defect information area from the back portion thereof. The temporary defect management information TDDS #1, TDDS #2, TDDS #3, and the like may also be sequentially written to the temporary defect management information area from the back portion thereof. The full flag information may be written in the form of a field as an element of the temporary defect management information. Again, for example, when a certain temporary defect management area is exhausted and does not allow temporary management information to be written thereto any more, the full flag may change from 0 to 1.

Referring to FIG. 6B, temporary defect information and corresponding temporary defect management information can be written as a pair to a temporary defect management area. In other words, temporary management information TDMA #1, TDMA #2, and the like can be sequentially written to the temporary defect management area from the front portion thereof. The temporary management information TDMA #1 can include temporary defect information TDFL #1 and corresponding temporary defect management information TDDS #1, and the temporary management information TDMA #2 can include temporary defect information TDFL #2 and corresponding temporary defect management information TDDS #2. In this embodiment of the present invention, the full flag information can be written in the form of a field as an element of the temporary defect management information. For example, when a certain temporary defect management area is exhausted and does not allow temporary management information to be written thereto any more, the full flag may change from 00h to 01h.

Alternatively, the temporary management information TDMA #1, TDMA #2, and the like may be sequentially written to the temporary defect management area from the back portion thereof. The full flag information may be written in the form of a field as an element of the temporary defect management information. Again, for example, when a certain temporary defect management area is exhausted and does not allow temporary management information to be written thereto any more, the full flag may change from 00h to 01h.

FIG. 7 is a diagram illustrating an operation of writing data to a user data area A and a spare area B, according to an embodiment of the present invention. Referring to FIG. 7, each of the user data area A and the spare area B includes a plurality of physical sectors (not shown) to which physical sector numbers are sequentially allocated, respectively. A logical sector number is allocated to at least one physical sector. However, since a logical sector number is allocated to a replacement sector in the spare area B, thereby excluding a defective sector in the user data area A, even though it is presumed that the size of a physical sector is the same as that of a corresponding logical sector, a physical sector number may not be identical to a logical sector number.

In FIG. 7, circled numerals ① through ⑦ denote sections of a recording medium, respectively, on which verify-after-write operations are performed. A reproducing and/or recording apparatus writes user data to the section ①, then goes back to the beginning of the section ①, and then verifies whether the user data has been correctly written to the section ① or whether a defect has occurred in the section ①. When a defect is found, a sector having the defect is defined as a defective sector, for example, "Defect #1." In addition, the reproducing and/or recording apparatus re-writes data written to Defect #1 to the spare area B. A sector, to which the data originally written to Defect #1 is re-written in the spare area B, is referred to as Replacement #1.

Under the condition that the second temporary defect management area is updated whenever a verify-after-write operation is completed, the reproducing and/or recording apparatus writes information on Defect #1 and information on Replacement #1, together, as TDFL #1 to the second temporary defect management area. In addition, the reproducing and/or recording apparatus writes management information for managing TDFL #1 to the second temporary defect management area as TDDS #1.

Next, the reproducing and/or recording apparatus writes user data to the section ②, then goes back to the beginning of the section ②, and then verifies whether the user data has been correctly written to the section ② or whether a defect has occurred in the section ②. When a defect is found, a sector having the defect is defined as "Defect #2." In the same manner as described above, Replacement #2, corresponding to Defect #2, is generated thereafter. Information on Defect #2 and information on Replacement #2 are together written as TDFL #2 to the second temporary defect management area. In addition, management information for managing TDFL #2 is written as TDDS #2 to the second temporary defect management area.

With respect to the section ③, Defect #3 and Replacement #3 are generated. With such manner, the second temporary defect management area is updated. In the section ④, a defective sector is not defined since a defect is not found. After the verify-after-write operation is completed, with respect to the section ④, when termination of Recording operation #1 is predicted, i.e., when a user presses an eject button or when user data corresponding to a recording operation is completely written, information on Defects #1, #2, and #3, which are defective sectors found among sections ① through ④, is written as first temporary management information, i.e., TDFL #1, to the first temporary defect management area. In addition, management information for managing TDFL #1, written to the first temporary defect management area, is written as TDDS #1 to the first temporary defect management area.

When Recording operation #2 starts, Defect #4, Replacement #4, Defect #5, and Replacement #5 are generated while user data is written to the sections ⑤ through ⑦, in the same manner as described above. Whenever each verify-after-write operation is completed, the second temporary defect management area is updated. When termination of Recording operation #2 is predicted, the reproducing and/or recording apparatus writes information on Defects #4 and #5 and TDFL #1, written to the first temporary defect management area, together as second temporary defect information, i.e., TDFL #2, to the first temporary defect management area. In addition, the reproducing and/or recording apparatus writes management information for managing TDFL #2 to the first temporary defect management area as TDDS #2.

Figure 8:
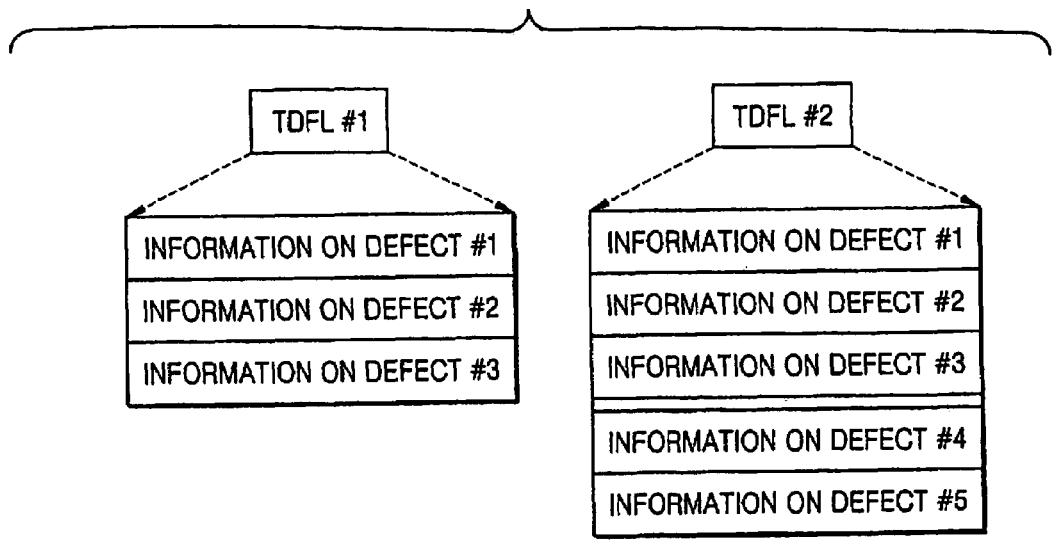
FIG. 8 is a diagram illustrating data structures of TDFL #1 and TDFL #2, respectively, written to a first temporary defect management area, according to an embodiment of the present invention.

FIG. 8 is a diagram illustrating data structures of TDFL #1 and TDFL #2, respectively, written to the first temporary defect management area, according to an embodiment of the present invention. Referring to FIG. 8, TDFL #1 in the first temporary defect management area includes the information on Defects #1, #2, and #3, previously discussed relating the embodiment illustrated in FIG. 7. The information on Defect #1 includes the position of Defect #1 and the position of Replacement #1. The information on Defect #2 includes the position of Defect #2 and the position of Replacement #2. The information on Defect #3 includes the position of Defect #3 and the position of Replacement #3.

TDFL #2 in the first temporary defect management area includes the information included in TDFL #1 and information on the information on Defects #4 and #5. In other words, TDFL #2 includes the information on Defects #1, #2, #3, #4, and #5.

Figure 9:
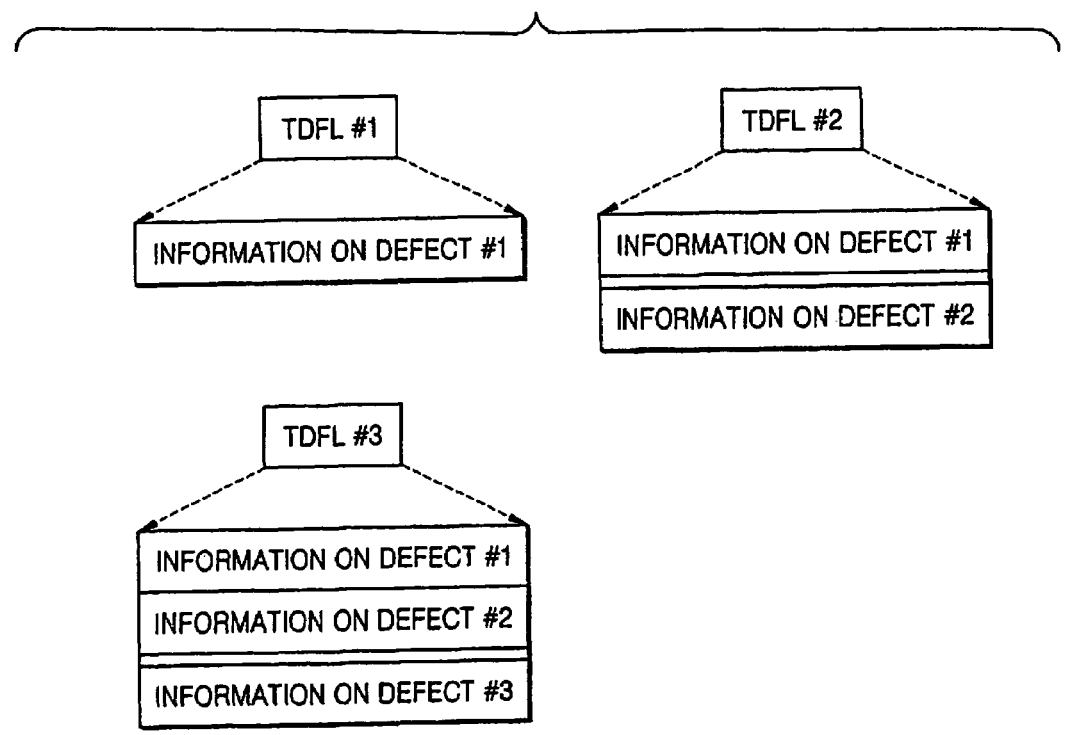
FIG. 9 is a diagram illustrating data structures of TDFL #1, TDFL #2, and TDFL #3, respectively, written to a second temporary defect management area, according to an embodiment of the present invention.

FIG. 9 is a diagram illustrating data structures of TDFL #1, TDFL #2, and TDFL #3, respectively, written to the second temporary defect management area, according to an embodiment of the present invention. Referring to FIG. 9, in the second temporary defect management area, TDFL #1 includes the information on Defect #1, TDFL #2 includes the information on Defects #1 and #2, and TDFL #3 includes the information on Defects #1, #2, and #3.

Figure 10:
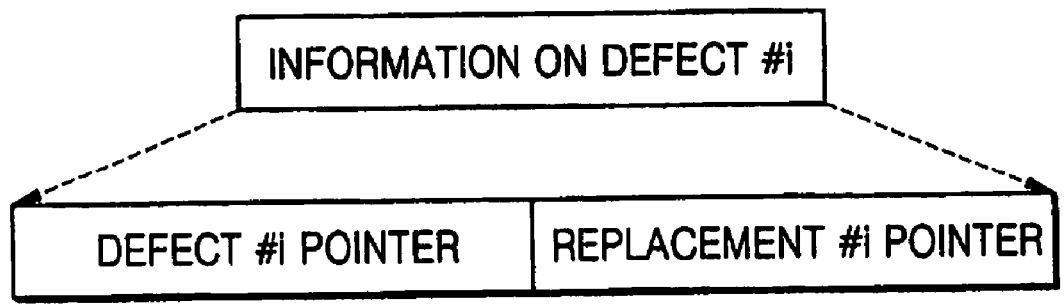
FIG. 10 is a diagram illustrating a data structure of information on Defect #1, shown in FIGS. 8 and 9, according to an embodiment of the present invention.

FIG. 10 is a diagram illustrating a data structure of information on Defect #i, according to embodiments shown in FIGS. 8 and 9. Referring to FIG. 10, the information on Defect #i includes Defect #i pointer and Replacement #i pointer. The Defect #i pointer indicates the start and end positions of Defect #i. The Replacement #i pointer indicates the start and end positions of Replacement #i.

The following description concerns a method embodiment of managing defects on the write-once recording medium 100 having the first and second temporary defect management areas, as shown in FIG. 3A, 3B, or 4.

Defect management can be performed according to linear replacement. Defect management results are written as temporary management information to the first and second temporary defect management areas with different periods, e.g., according to the different periods for first and second temporary defect management areas explained above. The temporary management information includes temporary defect information and temporary defect management information. The temporary defect information indicates the position of a defective sector and the position of a replacement sector for the defective sector. The temporary defect management information is used to manage the temporary defect information and includes information indicating a position where the temporary defect information is written.

In an embodiment of the present invention, temporary defect information and temporary defect management information are written to the second temporary defect management area according to a write period, e.g., whenever a predetermined number of clusters are filled in the user data area or whenever a verify-after-write operation is performed at least one time. Temporary defect information and temporary defect management information are written to the first temporary defect management area whenever a recording operation is terminated, for example. Writing new temporary defect information and new temporary defect management information to an area is referred to as an update of the area.

Most recently written temporary defect information and temporary defect management information, i.e., the most recently updated temporary management information, is written to a defect management area in response to a user's command or when finalization is performed. The most recently updated temporary management information is written to the defect management area for the following reasons. Writing the most recently updated temporary management information, including temporary defect information and temporary defect management information, to the defect management area when data will not be recorded on the recording medium 100 any more, e.g., when the recording medium 100 is finalized, allows a recording or playback apparatus to quickly read information from the recording medium 100. In addition, writing the defect management information to a plurality of places increases reliability of information.

The following embodiment corresponds to a case where the first temporary defect management area is exhausted first.

The first temporary defect management area is updated whenever a recording operation is completed. If a user enters an eject command, the last temporary management information in the second temporary defect management area is written to the first temporary defect management area because the second temporary defect management area is updated whenever the verify-after-write operation is completed and the verify-after-write is usually performed multiple times during one recording operation. However, the first temporary defect management area may not have enough space to write temporary management information thereto. Accordingly, when the recording medium 100 is inserted into a reproducing and/or recording apparatus, available space of the first temporary defect management area is checked to determine whether the first temporary defect management area can be used. When it is determined that the first temporary defect management area cannot be used because it is completely exhausted or does not have sufficient space, defect management is performed using only the second temporary defect management area. In this situation, the reproducing and/or recording apparatus writes "full" flag information indicating the first temporary defect management area is full and cannot be used when updating the second temporary defect management area. Thereafter, when the recording medium 100 is re-inserted into a reproducing and/or recording apparatus, the reproducing and/or recording apparatus recognizes that the first temporary defect management area cannot be used, based on the full flag information, and updates only the second temporary defect management area.

The following embodiment corresponds to a case where the second temporary defect management area is exhausted first.

Since the second temporary defect management area is updated whenever the verify-after-write operation is completed, it can be exhausted completely during recording or playback. Accordingly, when a defect occurs or temporary management information needs to be updated after the verify-after-write operation, since the second temporary defect management area was exhausted completely, the second temporary defect management area cannot be updated. In this situation, the reproducing and/or recording apparatus shown in FIG. 2 stores update information for the second temporary defect management area in the memory unit 3 and writes the update information to the first temporary defect management area when the first temporary defect management area is updated, i.e., when a recording operation is completed. When writing the update information to the first temporary defect management area, the reproducing and/or recording apparatus also writes full flag information to the first temporary defect management area indicating that the second temporary defect management area is completely exhausted. Thereafter, defect management is performed using only the first temporary defect management area. In other words, temporary management information is written to the first temporary defect management area whenever a recording operation is completed.

According to the present invention, a plurality of temporary defect management areas are allocated to a write-once recording medium for defect management, and update information is written to a defect management area in response to a user's command or finalization, so that the write-once recording medium can be correctly played back by a reproducing and/or recording apparatus for a rewritable disc.

In addition, when at least one among the plurality of temporary defect management areas is exhausted, this fact is written as "full" flag information to at least one among the remaining temporary defect management areas so that the reproducing and/or recording apparatus recognizes this fact and does not write temporary management information to the exhausted area. As a result, reliability of a system can be secured.

As noted above, embodiments of the present invention can be implemented by a medium including computer readable code controlling control unit 2, for example, to control the implementation of the aforementioned embodiments, without being limited thereto. Such coding would be within the skill of one skilled in the art after disclosure of the embodiments of the present invention. As described herein, the medium can be a recording medium, e.g., a memory device, an optical medium, a magnetic medium, etc.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of managing defects on a recording medium, the recording medium including a plurality of temporary defect management areas for managing defects detected on the recording medium, the method comprising:
    performing defect management using the plurality of temporary defect management areas; and
    writing full flag information indicating that one temporary defect management area, of the plurality of temporary defect management areas, is exhausted to at least one of the remaining plurality of temporary defect management areas when the one temporary defect management area is exhausted.

2. The method of claim 1, wherein the recording medium further comprises a defect management area, separate from the temporary defect management areas, for defect management during playback of the recording medium.

3. The method of claim 1, further comprising performing the defect management using the remaining temporary defect management areas, without the one temporary defect management area that is exhausted, when the at least one of the remaining plurality of temporary defect management areas includes the full flag information.

4. The method of claim 1, further comprising:
    disposing at least one of the plurality of temporary defect management areas in at least one of a lead-in area, a lead-out area, and an outer area of the recording medium; and
    disposing at least one of the plurality of temporary defect management areas in a data area of the recording medium.

5. The method of claim 4, wherein the writing of the full flag information comprises writing full flag information, indicating that the one temporary defect management area is exhausted, to the one of the remaining plurality of temporary defect management areas disposed in the data area when the one temporary defect management area disposed in at least one of the lead-in area, the lead-out area, and the outer area is exhausted.

6. The method of claim 4, wherein the writing of the full flag information comprises writing full flag information indicating, that the one temporary defect management area is exhausted, to the one of the remaining plurality of temporary defect management areas disposed in at least one of the lead-in area, the lead-out area, and the outer area when the one temporary defect management area disposed in the data area is exhausted.

7. The method of claim 1, wherein temporary defect information, including information of detected defects, is recorded in temporary defect management areas in a reverse sequencing from a rear of each respective temporary defect management area to a front of each respective temporary defect management area.

8. A method of managing defects on a recording medium having a single recording layer on which a lead-in area, a data area, and a lead-out area are sequentially disposed, the data area having a first spare area and a second spare area at the respective opposite ends thereof, the method comprising:
    allocating a first temporary defect management area to at least one of the lead-in area and the lead-out area of the recording medium;
    allocating a second temporary defect management area between the first spare area and a user data area or between the user data area and the second spare area;
    performing defect management for the recording medium using the first and second temporary defect management areas; and
    writing full flag information, indicating that one of the first and second temporary defect management areas is exhausted, to the other one of the first and second temporary defect management areas, when the one of the first and second temporary defect management areas is exhausted.

9. The method of claim 8, further comprising performing the defect management using the other one of the first and second temporary defect management areas, without the one of the first and second temporary defect management areas that is exhausted, when the other one of the first and second temporary defect management areas includes the full flag information.

10. The method of claim 8, wherein the performing of the defect management comprises:
    updating temporary management information in the second temporary defect management area whenever a predetermined number of clusters in the user data area are filled or whenever a verify-after-write operation, on the recording medium, is completed a predetermined number of times; and
    updating temporary management information in the first temporary defect management area whenever a recording operation is completed,
    wherein the updating of temporary management information in the first temporary defect management area occurs according to a period different from the updating of the temporary management information in the second temporary defect management area.

11. The method of claim 8, wherein the performing of the defect management comprises writing the most update temporary management information in the first or second temporary defect management area to a defect management area provided in at least one of the lead-in area and the lead-out area of the recording medium, with the defect management area being used for defect management during playback of the recording medium.

12. The method of claim 8, further comprising recording temporary defect information, including information of detected defects, in the first and/or second temporary defect management areas in a reverse sequencing from a rear of each respective temporary defect management area to the front of each respective temporary defect management area.

13. A method of managing defects on a recording medium having a first recording layer and a second recording layer, the first recording layer including a lead-in area, a data area, and an outer area which are sequentially disposed according to a recording path wherein the data area of the first recording layer has a first spare area and a second spare area at the respective opposite ends thereof, the second recording layer including an outer area, a data area, and a lead-out area which are sequentially disposed according to the recording path wherein the data area of the second recording layer has a third spare area and a fourth spare area at the respective opposite ends thereof, the method comprising:
 allocating a first temporary defect management area to at least one among the lead-in area, the lead-out area, and the outer areas of the recording medium;
 allocating a second temporary defect management area between the first spare area and a user data area and/or between the fourth spare area and the user data area;
 performing defect management for the recording medium using the first and second temporary defect management areas; and
 writing full flag information, indicating that one of the first and second temporary defect management areas is exhausted, to the other one of the first and second temporary defect management areas when the one of the first and second temporary defect management areas is exhausted.

14. The method of claim 13, further comprising performing the defect management using the other one of the first and second temporary defect management areas, without the one of the first and second temporary defect management areas that is exhausted, when the other one of the first and second temporary defect management areas includes the full flag information.

15. The method of claim 13, wherein the performing of the defect management comprises:
 updating temporary management information in the second temporary defect management area whenever a predetermined number of clusters in the user data area are filled or whenever a verify-after-write operation, on the recording medium, is completed a predetermined number of times; and
 updating temporary management information in the first temporary defect management area whenever a recording operation is completed,
 wherein the updating of temporary management information in the first temporary defect management area occurs according to a period different from the updating of the temporary management information in the second temporary defect management area.

16. The method of claim 13, wherein the performing of the defect management comprises writing the most update temporary management information in the first or second temporary defect management area to a defect management area provided in at least one among the lead-in area, the lead-out area, and the outer areas of the recording medium, with the defect management area being used for defect management during playback of the recording medium.

17. The method of claim 13, wherein temporary defect information, including information of detected defects, is recorded in the first and/or second temporary defect management areas in a reverse sequencing from a rear of each respective temporary defect management area to the front of each respective temporary defect management area.

18. A reproducing and/or recording apparatus comprising:
 a pickup to write data to or read data from a recording medium; and
 a control unit to verify data written to or read from the recording medium by the pickup, perform defect management using a plurality of temporary defect management areas provided on the recording medium, and control the pickup to write full flag information, indicating that one of the plurality of temporary defect management areas is exhausted, to at least one of the remaining temporary defect management areas when the one temporary defect management area is exhausted.

19. The reproducing and/or recording apparatus of claim 18, wherein the control unit controls the pickup to use a defect management area of the recording medium, separate from the temporary defect management areas, for defect management of the recording during playback of the recording medium.

20. The reproducing and/or recording apparatus of claim 19, wherein the defect management area is in a compatible location for rewritable recording media and the recording medium, which is a write-once recording medium.

21. The reproducing and/or recording apparatus of claim 18, wherein the reproducing and/or recording apparatus is compatible with both rewritable recording media and the recording medium, which is a write-once recording medium.

22. The reproducing and/or recording apparatus of claim 18, wherein the control unit performs the defect management using the remaining temporary defect management areas, without the one of the first and second temporary defect management areas that is exhausted, when the at least one remaining temporary defect management area includes the full flag information.

23. The reproducing and/or recording apparatus of claim 18, wherein at least one among the plurality of temporary defect management areas is disposed in at least one of a lead-in area, a lead-out area, and an outer area of the recording medium, and at least one of the remaining plurality of temporary defect management areas is disposed in a data area of the recording medium.

24. The reproducing and/or recording apparatus of claim 23, wherein the control unit controls the pickup to write full flag information, indicating that the one temporary defect management area is exhausted, to the at least one remaining temporary defect management areas disposed in the data area when the one temporary defect management area, disposed in at least one among the lead-in area, the lead-out area, and the outer area, is exhausted.

25. The reproducing and/or recording apparatus of claim 24, wherein the control unit controls the pickup to write full flag information, indicating that the one temporary defect management area is exhausted, to at least one of the remaining temporary defect management areas disposed in at least one of the lead-in area, the lead-out area, and the outer area when the one temporary defect management area disposed in the user data area is exhausted.

26. The reproducing and/or recording apparatus of claim 18, wherein temporary defect information, including information of detected defects, is recorded in temporary defect management areas in a reverse sequencing from a rear of each respective temporary defect management area to the front of each respective temporary defect management area.

27. A write-once recording medium having a single recording layer on which a lead-in area, a data area, and a lead-out area are sequentially disposed, the data area having a first spare area, a user data area, and a second spare area which are sequentially disposed, the write-once recording medium comprising:
- a defect management area provided in at least one of the lead-in area and the lead-out area including defect management information for performing defect management of the write-once recording medium during playback;
- a first temporary defect management area provided in at least one of the lead-in area and the lead-out area including temporary management information recorded to the write-once recording medium with a predetermined period; and
- a second temporary defect management area provided between the first spare area and the user data area or between the user data area and the second spare area including temporary management information recorded to the write-once recording medium with a period different from the predetermined period,
- wherein full flag information, indicating whether the second temporary defect management area is exhausted, is recorded in the first temporary defect management area, and full flag information, indicating whether the first temporary defect management area is exhausted, is recorded in the second temporary defect management area.

28. The write-once recording medium of claim 27, wherein the temporary management information in the second temporary defect management area is updated whenever a predetermined number of clusters in the user data area are recorded or whenever a verify-after-write operation, of the write-once recording medium, is completed a predetermined number of times.

29. The write-once recording medium of claim 27, wherein the temporary management information in the first temporary defect management area is updated whenever a recording operation is completed.

30. The write-once recording medium of claim 27, wherein the most update temporary management information in the first or second temporary defect management areas is written to the defect management area when the write-once recording medium is finalized.

31. A write-once recording medium having a first recording layer and a second recording layer, the first recording layer including a lead-in area, a data area, and an outer area which are sequentially disposed according to a recording path and wherein the data area has a first spare area and a second spare area at the respective opposite ends thereof, the second recording layer including an outer area, a data area, and a lead-in area which are sequentially disposed according to the recording path and wherein the data area has a third spare area and a fourth spare area at the respective opposite ends thereof, the write-once recording medium comprising:
- a defect management area provided in at least one of the lead-in area, the lead-out area, and the outer areas, including defect management information;
- a first temporary defect management area provided in at least one of the lead-in area, the lead-out area, and the outer areas, including temporary management information recorded to the write-once recording medium with a predetermined period; and
- a second temporary defect management area provided between the first spare area and the user data area of the first recording layer and/or between the fourth spare area and the user data area of the second recording layer, including temporary management information recorded to the write-once recording medium with a period different from the predetermined period,
- wherein full flag information, indicating whether the second temporary defect management area is exhausted, is recorded in the first temporary defect management area, and full flag information, indicating whether the first temporary defect management area is exhausted, is recorded in the second temporary defect management area.

32. The write-once recording medium of claim 31, wherein the temporary management information in the second temporary defect management area is updated whenever a predetermined number of clusters in a user data area of the write-once recording medium are filled or whenever a verify-after-write operation, for the write-once recording medium, is completed a predetermined number of times.

33. The write-once recording medium of claim 31, wherein the temporary management information in the first temporary defect management area is updated whenever a recording operation of the write-once recording medium is completed.

34. The write-once recording medium of claim 31, wherein the most update temporary management information in the first or second temporary defect management areas is recorded in the defect management area when the write-once recording medium is finalized.

35. A recording medium, comprising:
- a defect management area recording defect management information for defect management of user data recorded on the recording medium during playback of the user data; and
- a plurality of temporary defect management areas recording temporary management information for defect management, of a user data area, during recording of the user data on the recording medium, and including information on whether one of the plurality of temporary defect management areas has been exhausted, wherein
- upon finalization of the recording medium, temporary management information defect information recorded in one of the plurality of temporary defect management areas is recorded in the defect management area as the defect management information.

36. The recording medium of claim 35, wherein the recording of the temporary management information defect information as the defect management information is based on the recorded information on whether one of the plurality of temporary defect management areas has been exhausted.

37. A defect management method, comprising:
- recording a plurality of temporary defect management areas including temporary defect information for defect management, of a user data area, during recording of user data on the recording medium, and recording information on whether one of the plurality of temporary defect management areas has been exhausted; and
- recording one of the plurality of temporary defect management areas in a defect management area of the recording medium, for defect management of user data recorded on the recording medium during playback of the user data.

38. The defect management method of claim 37, wherein the recording of the temporary defect information in the defect management area is based on the recorded information on whether one of the plurality of temporary defect management areas has been exhausted.

39. The defect management method of claim 37, further comprising reproducing the user data from the recording medium based on the defect information recorded in the defect management area, which is based on the temporary defect information recorded in the one temporary defect management area.

40. A computer readable medium comprising computer readable code controlling the implementation of the method of claim 37.

41. A computer readable medium comprising computer readable code to control the reproducing and/or recording apparatus of claim 18 to perform defect management using a plurality of temporary defect management areas and the recording of the full flag information.

42. A computer readable medium comprising computer readable code controlling the implementation of the method of managing defects of claim 1.

43. A computer readable medium comprising computer readable code controlling the implementation of the method of managing defects of claim 8.

44. A computer readable medium comprising computer readable code controlling the implementation of the method of managing defects of claim 13.

* * * * *

UNITED STATES PATENT AND TRADEMARK OFFICE
CERTIFICATE OF CORRECTION

PATENT NO. : 7,583,575 B2 Page 1 of 1
APPLICATION NO. : 10/804016
DATED : September 1, 2009
INVENTOR(S) : Hwang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1566 days.

Signed and Sealed this

Fourteenth Day of September, 2010

David J. Kappos
*Director of the United States Patent and Trademark Office*